United States Patent
Winkelmann

(10) Patent No.: US 8,845,200 B2
(45) Date of Patent: Sep. 30, 2014

(54) ROLLING BEARING FOR A DUAL MASS FLYWHEEL IN A MOTOR VEHICLE

(75) Inventor: Ludwig Winkelmann, Erlangen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 13/381,582

(22) PCT Filed: Jul. 2, 2010

(86) PCT No.: PCT/EP2010/059433
§ 371 (c)(1),
(2), (4) Date: Dec. 29, 2011

(87) PCT Pub. No.: WO2011/012401
PCT Pub. Date: Feb. 3, 2011

(65) Prior Publication Data
US 2012/0114278 A1    May 10, 2012

(30) Foreign Application Priority Data
Jul. 25, 2009   (DE) .......................... 10 2009 034 798

(51) Int. Cl.
*F16C 33/78* (2006.01)
*F16C 33/58* (2006.01)
*F16C 19/06* (2006.01)

(52) U.S. Cl.
CPC ......... *F16C 33/7886* (2013.01); *F16C 33/7853* (2013.01); *F16C 2361/55* (2013.01)
USPC ............................ 384/477; 384/482; 384/484

(58) Field of Classification Search
USPC .......... 384/477, 482, 485–486, 489; 277/370, 277/402, 574; 192/70.252, 98
See application file for complete search history.

(56) References Cited

U.S. PATENT DOCUMENTS

| 3,245,735 A | * | 4/1966 | Sikora ........................... 384/482 |
| 3,519,316 A | * | 7/1970 | Gothberg ...................... 384/489 |
| 3,936,105 A | * | 2/1976 | Asberg .......................... 384/482 |

(Continued)

FOREIGN PATENT DOCUMENTS

| DE |    42 14 655 A1 | 12/1992 |
| DE |   196 31 725 A1 |  3/1997 |
| DE | 10 2005 008 006 A1 |  8/2006 |
| DE | 10 2008 048 517 A1 |  3/2010 |

(Continued)

*Primary Examiner* — Marcus Charles
(74) *Attorney, Agent, or Firm* — Simpson & Simpson, PLLC

(57) ABSTRACT

A single-row deep groove ball bearing made substantially of an inner ring and an outer ring disposed coaxially thereto and balls disposed between the rings. The balls roll in deep groove tracks in an outer face of the inner ring and in an inner face of the outer ring, and the balls are held at equal distances to each other in the circumferential direction by a housing. The interior of the bearing is sealed by two circular ring-shaped seals axially opposite each other. At least one of the seals is a lip seal, which has an angular profile. A shape-stable radial seal leg of the seal is attached to the outer ring and forms a gap seal with an axial side of the inner ring, and a sealing lip, which is an overpressure valve, is disposed under the inner ring and slidingly contacts the inner face of the inner ring.

11 Claims, 3 Drawing Sheets

(56) References Cited

U.S. PATENT DOCUMENTS

| | | | |
|---|---|---|---|
| 4,984,908 A | | 1/1991 | Kronenberger et al. |
| 5,310,267 A | | 5/1994 | Jaeckel et al. |
| 5,620,076 A | * | 4/1997 | Voit et al. .................... 192/85.57 |
| 6,464,060 B1 | * | 10/2002 | Ponson et al. ................... 192/98 |
| 6,811,013 B2 | * | 11/2004 | Dittmer et al. ................... 192/98 |
| 2004/0020743 A1 | | 2/2004 | Dittmer et al. |
| 2005/0152628 A1 | * | 7/2005 | Egami et al. ................... 384/462 |

FOREIGN PATENT DOCUMENTS

| | | | | |
|---|---|---|---|---|
| FR | 1 383 004 A | | 12/1964 | |
| JP | 07054925 A | * | 2/1995 | ............ F16F 15/131 |
| JP | 2008014442 A | * | 1/2008 | ............ F16C 33/66 |
| WO | 98/06957 A1 | | 2/1998 | |

* cited by examiner

ROLLING BEARING FOR A DUAL MASS FLYWHEEL IN A MOTOR VEHICLE

CROSS-REFERENCE TO RELATED APPLICATIONS

This application is a 371 of PCT/DE2010/059433 filed Jul. 2, 2010, which in turn claims the priority of DE 10 2009 034 798.4 filed Jul. 25, 2009. The priority of both applications is hereby claimed and both applications are incorporated by reference herein.

FIELD OF THE INVENTION

The invention relates to a rolling hearing designed as a single-row deep groove ball bearing. The rolling bearing can particularly advantageously be used for mounting a secondary mass on a primary mass of a dual-mass flywheel in a motor vehicle.

BACKGROUND OF THE INVENTION

As is known, dual-mass flywheels are arranged between the internal combustion engine and the gearbox of a motor vehicle and are provided for increasing driving comfort. A dual-mass flywheel of this type is composed substantially of a disk-shaped primary mass which is connected directly to the crankshaft of the internal combustion engine and of a disk-shaped secondary mass which is arranged coaxially with respect to this primary mass and which is connected via a clutch to the input shaft of the gearbox. Here, the two masses are coupled to one another by means of a plurality of damping means arranged between them, said damping means conventionally being in the form of two curved spiral compression springs arranged opposite one another, and this masses can rotate relative to one another counter to the action of this damping means via a friction-reducing bearing arranged on a bearing flange on the primary mass. During operation of the motor vehicle, the primary mass is actively driven by means of the rotating crankshaft of the internal combustion engine, while the secondary mass is carried along by means of the damping elements and in turn drives the gearbox input shaft. Here, the damping elements serve to dampen firstly the non-uniformities resulting from imbalances of the moving masses in the drivetrain, and secondly the rotational non-uniformities of the internal combustion engine resulting from the piston movements.

Since the bearing between the secondary mass and the primary mass of the dual mass flywheel is subjected to particularly high wear in particular as a result of temperature influences from the clutch, this bearing is conventionally formed by special deep groove ball bearings in the form of DFC bearings, such as are known, for example, from DE 42 14 655 A1 and from DE 196 31 725 A1. The deep-groove ball bearings are composed, as is known, of an inner bearing ring and of an outer bearing ring and also of a multiplicity of bearing balls which are arranged between the bearing rings and which roll in groove-like raceways in the outer lateral surface of the inner bearing ring and in the inner lateral surface of the outer bearing ring and which are held at uniform intervals from one another in the circumferential direction by a bearing cage. Since no lubricant replenishment facilities are provided for deep-groove ball bearings in dual-mass flywheels, their service life is therefore dependent on the size of the lubricant reserve provided. To fill the interior space of these deep-groove ball bearings with a lubricant quantity adequate for their entire service life, the bearings therefore have, at one side, special plastic sealing caps which engage over and under the outer bearing ring and the inner bearing ring respectively and which are formed with an additional axial cavity, by means of which the volume of the bearing interior space is increased several times over.

Such plastic sealing caps on the deep-groove ball bearings of dual mass flywheels are however relatively complex to manufacture and are fragile during bearing assembly, and have furthermore proven to be disadvantageous in practice because their seal collar which bears slidingly against the inner lateral surface of the inner bearing ring has a relatively high preload and a relatively low elasticity, as a result of which a high frictional torque acts between it and the inner bearing ring. Here, the high frictional torque is a cause for almost complete premature wear of the seal collar, such that subsequently, as a result of the lack of coverage of the seal region, lubricant leakages occur via the adjoining sealing gap between the plastic sealing cap and the inner bearing ring, resulting in a shortening of the service life of the deep-groove ball bearing.

To avoid the above-described disadvantages, the German patent application with the official file reference 10 2008 048 517.9, which on the filing date of the present application had not yet been published, therefore proposes a rolling bearing for a dual mass flywheel, which rolling bearing has substantially the same design as the deep groove ball bearing described above but is formed with an axial width considerably greater than the standard dimensions in order to attain an interior space volume between the bearing rings which is adequately large to receive a lifetime filling of lubricant. Here, the interior space of the rolling bearing is sealed off by two circular-ring-shaped seals which are situated axially opposite one another and which are formed as metal-reinforced lip sealing rings, which at one side are in each case snapped into a retaining groove in the inner lateral surface of the outer bearing ring and at the other side have in each case two sealing lips which bear slidingly against the outer lateral surface of the inner bearing ring. Furthermore, a plurality of small ventilation bores are formed into the seals at the level of the bearing pitch circle, via which ventilation bores the rolling bearing can be positively ventilated if an admissible gas pressure in the interior space thereof is exceeded, which arises at relatively high temperatures as a result of gasification of the lubricant filling.

However, a disadvantage of the seals for deep groove ball bearings of dual mass flywheels is that the ventilation bores can only be formed by means of complex laser boring, and therefore necessitate the purchase of a correspondingly expensive laser boring device and suitable holding tools. Likewise, laser boring requires additional working steps such as the cleaning of the sealing rings after the lasering of the ventilation bores, and a visual inspection, as a result of which the manufacturing costs of such seals increase toward uneconomical levels. Furthermore, in practice, it has been found that such ventilation bores tend to become blocked as a result of dirt accumulation or gumming of the lubricant, such that the bores can no longer perform the function for which they are intended and, if the admissible gas pressure in the interior space of the bearing is exceeded, the lubricant is forced out via the elastic sealing lips of the sealing rings, likewise leading to a shortening of the service life of the deep groove ball bearing.

SUMMARY OF THE INVENTION

Taking the discussed disadvantages of the known prior art as a starting point, it is therefore the object of the present invention to design a rolling bearing, in particular single-row deep groove ball bearing for a dual mass flywheel, which is provided with wear-resistant seals which are cheap to manufacture and which simultaneously ensure reliable ventilation of the rolling bearing if an admissible gas pressure in the interior space thereof is exceeded.

Accordingly, the present invention broadly relates to a rolling bearing which comprises an inner bearing ring, an outer bearing ring arranged coaxially with respect to the inner bearing ring and a multiplicity of bearing balls which are arranged between the bearing rings and which roll in groove-like raceways in an outer lateral surface of the inner bearing ring and in an inner lateral surface of the outer bearing ring. The balls are held at uniform intervals from one another in the circumferential direction by a bearing cage. The interior space of the rolling bearing is sealed off by two circular-ring-shaped seals situated axially opposite one another and has a lifetime filling of a rolling bearing lubricant. At least one of the two seals is designed as an angle-profile-shaped lip seal whose dimensionally stable radial seal leg is fastened to the outer bearing ring and is arranged so as to form a gap seal with an axial side of the inner bearing ring. The angle-profile-shaped lip seal has an elastic axial sealing lip which engages under the inner bearing ring and bears slidingly against the inner lateral surface of the latter and is simultaneously designed as an overpressure valve, by means of which the rolling bearing, if an admissible gas pressure in the interior space thereof is exceeded, can be positively ventilated via the gap seal and via the sealing lip which lifts up from the inner lateral surface of the inner bearing ring at least in regions.

Preferred embodiments and advantageous refinements of the rolling hearing designed according to the invention will be described in the subclaims.

In one embodiment, only the seal at the secondary mass side is designed as an angle-profile-shaped lip seal. The seal at the primary mass side is formed by a lip sealing ring which is known per se and which at one side is snapped into a receiving groove in the inner lateral surface of the outer bearing ring and which at the other side has two sealing lips which bear slidingly against the outer lateral surface of the inner bearing ring. Such a seal pairing has proven to be particularly cheap and functionally adequate because the known lip seals provide optimum sealing against the escape of lubricant from the bearing and simultaneously prevent the ingress of dirt from the nearby clutch bell into the bearing. It would however also be conceivable for both seals of the rolling bearing to be formed as angle-profile-shaped lip seals.

In a further embodiment, the radial seal leg of the angle-profile-shaped lip seal is stiffened by a metal reinforcement and can be snapped with its free edge section into a further encircling receiving groove in the inner lateral surface of the outer bearing ring. Here, the metal reinforcement serves to provide the radial stiffness of the lip seal which is otherwise composed of a vulcanized-on elastomer, and ensures that the gap seal formed to the axial side of the inner bearing ring has a uniform gap dimension.

In another embodiment, the rolling bearing, the inner bearing ring, in relation to the outer bearing ring, has an axial width which is reduced by the thickness of the radial seal leg of the lip seal and by the gap dimension of the gap seal. In this way, it is ensured that the rolling bearing has a continuously uniform axial width when the lip seal has been inserted. Furthermore, the inner bearing ring is formed, on its inner lateral surface, with a bearing seat width which is reduced by approximately the length of the axial sealing lip of the lip seal, in order to provide the necessary installation space for the axial sealing lip. That part of the inner lateral surface of the inner bearing ring which is in sliding contact with the axial sealing lip may either have the same diameter as the bearing seat, such that the bearing flange on the primary mass should be formed with an undercut corresponding to the thickness of the sealing lip, or the inner lateral surface of the inner bearing ring is provided with a stepped undercut such that, when the lip seal has been inserted, the underside of the axial sealing lip is at approximately the same level as the bearing seat.

Furthermore, in one refinement, it is provided that that part of the inner lateral surface of the inner bearing ring which is in sliding contact with the axial sealing lip of the lip seal is additionally formed with an encircling groove and with a bevel running to the axial side of the inner bearing ring, in order thereby to reduce the frictional surface of the axial sealing lip against the inner bearing ring. An approximately wedge-shaped annular contour is thus formed on the inner lateral surface of the inner bearing ring between the encircling groove and the bevel, against which wedge-shaped annular contour the axial sealing lip of the lip seal bears only with low-friction linear contact with respect to the inner bearing ring. The elasticity of the axial sealing lip and unavoidable lubricant leakages escaping via the gap seal furthermore ensure that the axial sealing lip has virtually no wear over the service life of the rolling bearing.

Finally, in a variant of the rolling bearing the lip seal has, on the inner side of its radial seal leg, an additional pre-sealing lip, and that an additional centrifugal groove is formed into the outer lateral surface of the inner bearing ring directly in front of the pre-sealing lip of the lip seal. Here, the additional pre-sealing lip has a profile cross section approximately in the shape of a monopitch roof and is intended to prevent liquid or low-viscosity lubricant from being able to directly drip down into the gap seal between the seal leg and the axial side of the inner bearing ring. In contrast, the centrifugal groove in the outer lateral surface of the inner bearing ring preferably has a semi-circular profile cross section and, during bearing operation, forms a separation edge which is intended to prevent lubricant from creeping into the gap seal under centrifugal force. Furthermore, such a centrifugal groove may also be formed into the outer lateral surface of the inner bearing ring directly in front of the lip seal at the primary mass side, in order, on this side of the bearing too, to form a separation edge to prevent the lubricant from creeping under the sealing lips under centrifugal force.

In summary, the deep groove ball bearing designed according to the invention for a dual mass flywheel therefore has the advantage over deep groove ball bearings known from the prior art that it has a lip seal which is simultaneously designed as an overpressure valve which, despite being in sliding contact with the inner bearing ring, is almost free from wear owing to the elasticity of its axial sealing lip, and which ensures reliable ventilation of the rolling bearing if an admissible gas pressure in the interior space thereof is exceeded. In this way, it is simultaneously possible to dispense with the cumbersome formation of individual ventilation bores which are at risk of becoming blocked, such that the lip seal is extremely cheap to manufacture overall. Furthermore, it is possible, by dimensioning the axial scaling lip of the lip seal differently, to correspondingly limit the level of the admissible gas pressure in the interior space of the rolling bearing. Likewise, it is possible for the lip seal to be mounted in a simple and reliable manner on the rolling bearing without the risk of sealing lips being folded over, and the lip seal, as a result of the fact that it is visible from the outside, simultaneously allows the rolling bearing to be mounted reliably and in the correct position in the dual mass flywheel.

BRIEF DESCRIPTION OF THE DRAWINGS

A preferred embodiment of the rolling bearing designed according to the invention will be explained in more detail below with reference to the appended drawings, in which.

DETAILED DESCRIPTION OF THE INVENTION

Figure 1:
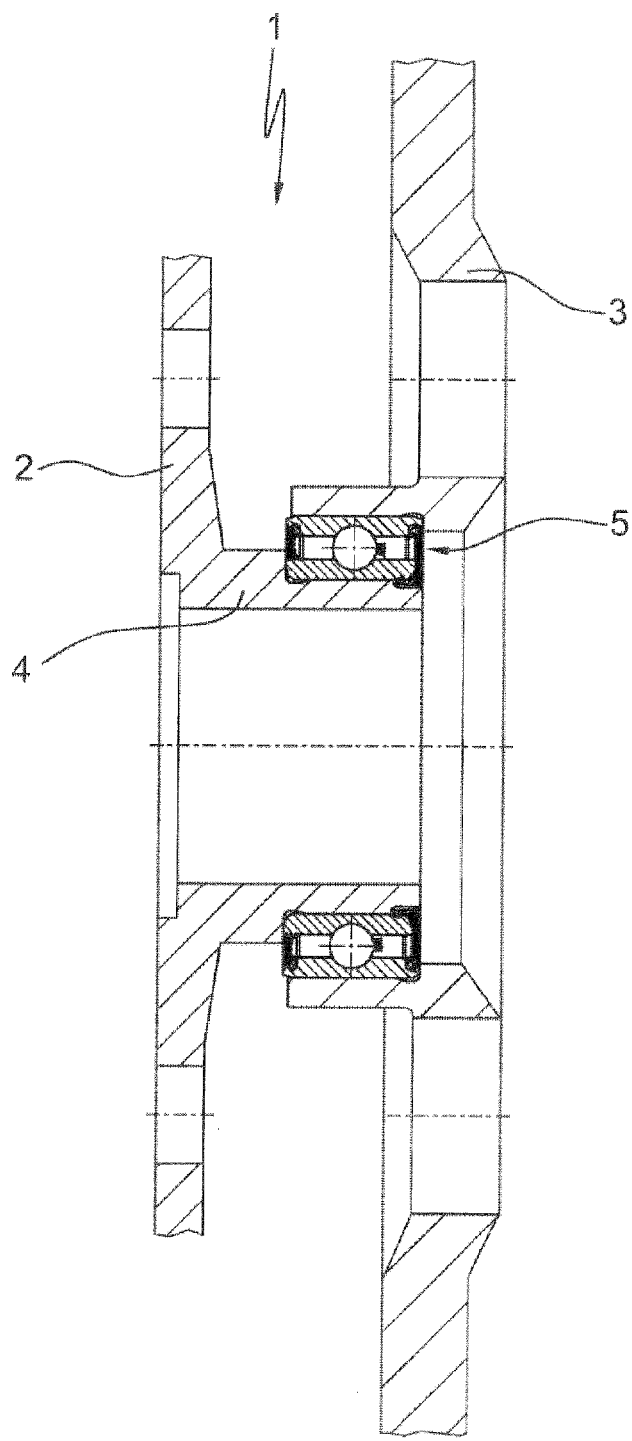
FIG. 1 shows a cross section through a dual mass flywheel having a rolling bearing designed according to the invention.

FIG. 1 shows a schematic illustration of a dual mass flywheel 1 for a motor vehicle, the dual mass flywheel being composed substantially of a disk-shaped primary mass 2 which is connected directly to the crankshaft of the internal combustion engine and of a disk-shaped secondary mass 3 which is arranged coaxially with respect to the primary mass 2 and which is connected via a clutch to the input shaft of the gearbox. Here, the two masses 2, 3 are coupled to one another by means of a plurality of damping means (not illustrated in any more detail) arranged between them, and can rotate relative to one another counter to the action of the damping means via a rolling bearing 5 arranged on a bearing flange 4 on the primary mass 2.

Figure 2:
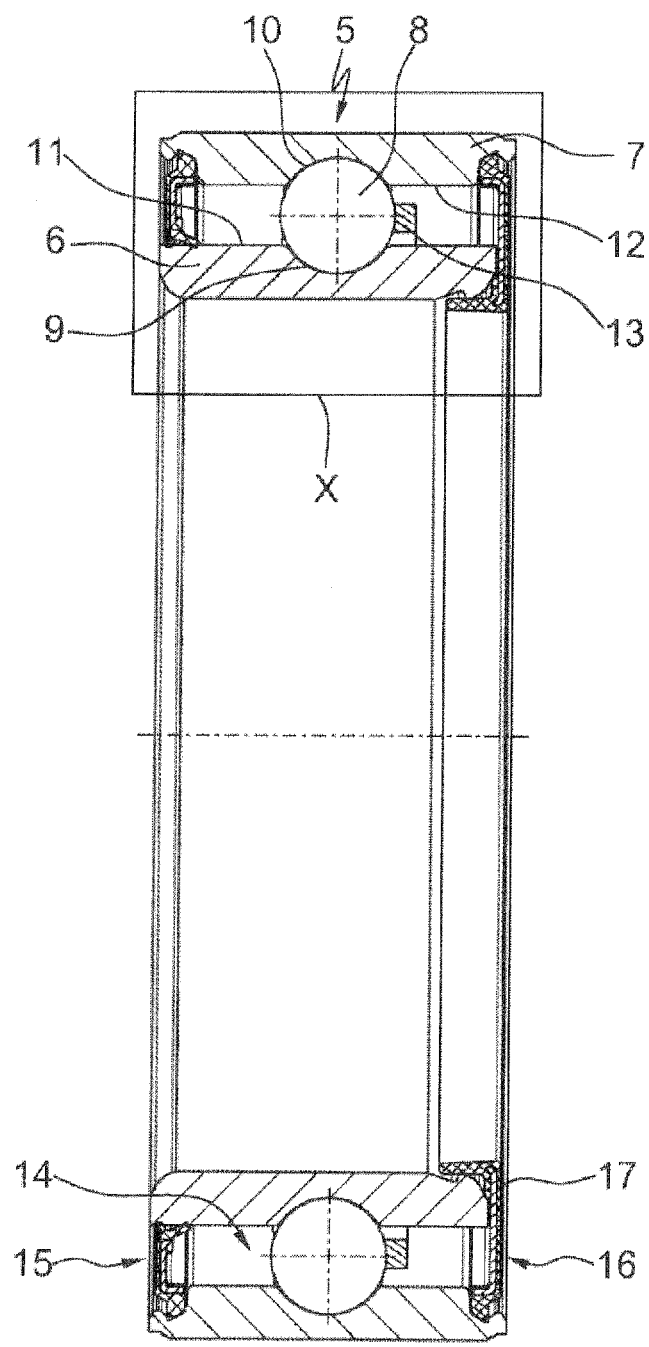
FIG. 2 shows an enlarged overall illustration of a rolling bearing designed according to the invention.

It is also clear from FIG. 2 that the rolling bearing 5 arranged in the dual mass flywheel 1 is composed substantially of an inner bearing ring 6 and of an outer bearing ring 7 arranged coaxially with respect to the inner bearing ring and also of a multiplicity of bearing balls 8 which are arranged between the bearing rings 6, 7 and which roll in groove-like raceways in the outer lateral surface 11 of the inner bearing ring 6 and in the inner lateral surface 12 of the outer bearing ring 7 and which are held at uniform intervals from one another in the circumferential direction by a bearing cage 13. Here, the interior space 14 of the rolling bearing 5 is sealed off by two circular-ring-shaped seals 15, 16 which are situated axially opposite one another and is completely filled with a rolling bearing lubricant (not illustrated in any more detail), the quantity of which is configured for the entire service life of the bearing.

Figure 3:
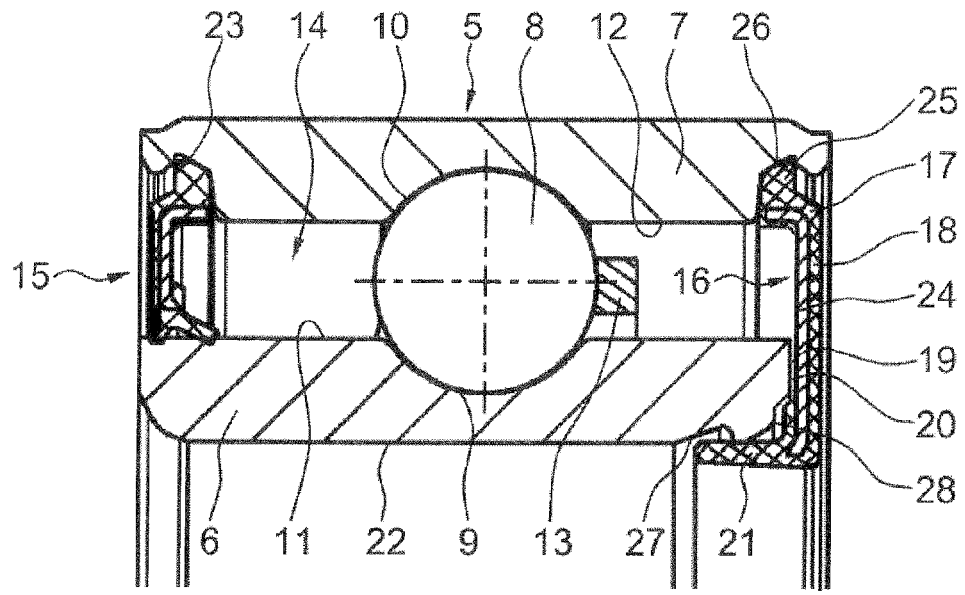
FIG. 3 shows an enlarged illustration of the detail X of the rolling bearing designed according to the invention as per FIG. 2.

It is also clear from FIG. 3 that the seal 16 at the secondary mass side is designed according to the invention as an angle-profile-shaped lip seal 17 whose dimensionally stable radial seal leg 18 is fastened to the outer bearing ring 7 and forms a gap seal 20 with an axial side 19 of the inner bearing ring 6, and whose elastic axial sealing lip 21 engages under the inner bearing ring 6 and bears slidingly against the inner lateral surface 22 of the latter. Here, the axial sealing lip 21 is simultaneously designed as an overpressure valve, by means of which the rolling bearing 5, if an admissible gas pressure in the interior space 14 thereof is exceeded, as a result of gasification of the lubricant filling, is positively ventilated via the gap seal 20 by virtue of the sealing lip 21 lifting up from the inner lateral surface 22 of the inner bearing ring 6 at least in regions. The seal 15 at the primary side is in contrast designed, as can be clearly seen, as a lip seal such as is known per se, which lip seal is held in an encircling receiving groove 23 in the inner lateral surface 12 of the outer bearing ring 7.

It can also be seen from FIG. 3 that the radial seal leg 18 of the angle-profile-shaped lip seal 17 is stiffened by a metal reinforcement 24 and can be snapped with its free edge section 25 into a further encircling receiving groove 26 in the inner lateral surface 12 of the outer bearing ring 7. Here, the metal reinforcement 24 serves to provide the radial stiffness of the lip seal 17 which is otherwise composed of a vulcanized-on elastomer, and ensures that the gap seal 20 formed to the axial side 19 of the inner bearing ring 6 has a uniform gap dimension.

It can likewise be seen in FIG. 3 that, in relation to the outer bearing ring 7, the inner bearing ring 6 has an axial width which is reduced by approximately the thickness of the radial seal leg 18 of the lip seal 17, and has, on its inner lateral surface 22, a bearing seat width which is reduced by approximately the length of the axial sealing lip 21. Here, that part of the inner lateral surface 22 of the inner bearing ring 6 which is in sliding contact with the axial sealing lip 21 has the same diameter as the bearing seat (not shown in any more detail) of the inner bearing ring, such that the bearing flange 4 on the primary mass 2 is formed, as indicated in FIG. 1, with an undercut corresponding to the thickness of the sealing lip 21.

Finally, it can also be seen in FIG. 3 that that part of the inner lateral surface 22 of the inner bearing ring 6 which is in sliding contact with the axial sealing lip 21 of the lip seal 17 is additionally formed with an encircling groove 27 and a bevel 28 running to the axial side 19 of the inner bearing ring 6, in order thereby to reduce the frictional surface of the axial sealing lip 21 against the inner bearing ring 6. A wedge-shaped annular contour is thus formed on the inner lateral surface 22 of the inner bearing ring 6 between the encircling groove 27 and the bevel 28, against which wedge-shaped annular contour the axial sealing lip 21 of the lip seal 17 bears only with low-friction linear contact with respect to the inner bearing ring 6.

Figure 4:
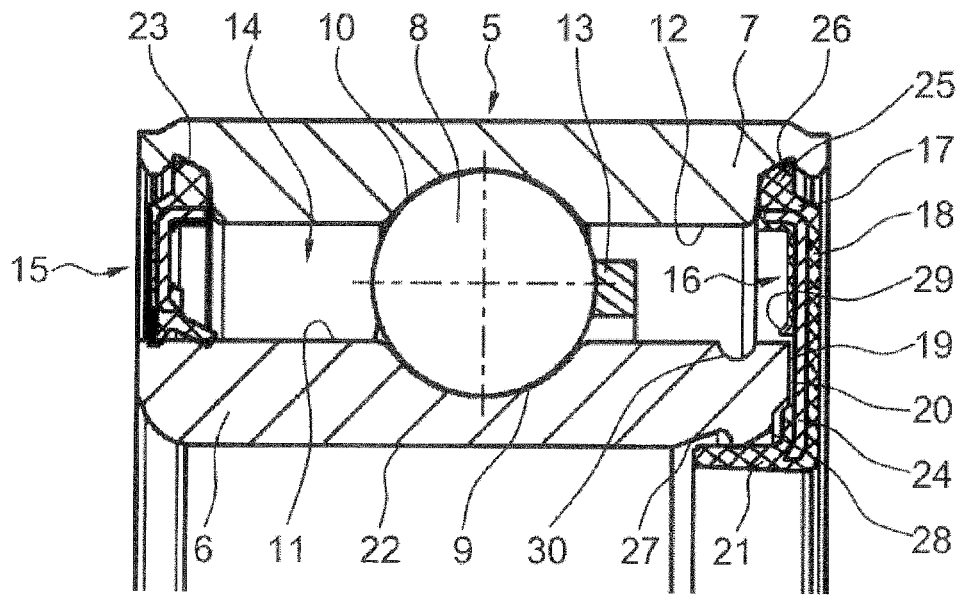
FIG. 4 shows an enlarged illustration of the detail X as per FIG. 2 with a variant of the rolling bearing designed according to the invention.

FIG. 4 furthermore illustrates a further advantageous variant of the rolling bearing 5 designed according to the invention, in which the lip seal 17 has, on the inner side of its radial seal leg 18, an additional pre-sealing lip 29 with a profile cross section in the shape of a monopitch roof, by means of which pre-sealing lip liquid lubricant can be prevented from directly dripping down into the gap seal 20 between the seal leg and the axial side 19 of the inner bearing ring 6 when the bearing is at a standstill. Furthermore, in this variant, an additional centrifugal groove 30 with a semi-circular profile cross section is formed into the outer lateral surface 11 of the inner bearing ring 6 directly in front of the pre-sealing lip 29 of the lip seal 17, which centrifugal groove forms a separation edge to prevent lubricant from creeping into the gap seal 20 under centrifugal force.

LIST OF REFERENCE NUMERALS

1 Dual Mass Flywheel
2 Primary Mass
3 Secondary Mass
4 Bearing Flange on 2
5 Rolling Bearing
6 Inner Bearing Ring
7 Outer Bearing Ring
8 Bearing Balls
9 Raceway in 6
10 Raceway in 7
11 Outer Lateral Surface of 6
12 Inner Lateral Surface of 7

13 Bearing Cage
14 Interior Space of 5
15 Seal
16 Seal
17 Lip Seal
18 Radial Seal Leg of 17
19 Axial Side of 6
20 Gap Seal
21 Axial Sealing Lip of 17
22 Inner Lateral Surface of 6
23 Receiving Groove in 12
24 Metal Reinforcement of 18
25 Edge Section of 18
26 Receiving Groove in 12
27 Groove in 22
28 Bevel on 22
29 Pre-Sealing Lip on 18
30 Centrifugal Groove in 11

The invention claimed is:

1. A rolling bearing, for a dual mass flywheel in a motor vehicle, comprising:
    an inner bearing ring having an inner lateral surface and an outer lateral surface with a grooved raceway in the outer lateral surface;
    an outer bearing ring, which is arranged coaxially with respect to the inner bearing ring, having an inner lateral surface and an outer lateral surface with a grooved raceway in the inner lateral surface arranged coaxially with respect to the inner bearing ring;
    a multiplicity of bearing balls arranged between the inner bearing ring and the outer bearing ring and which roll in the grooved raceway formed in the outer lateral surface of the inner bearing ring and in the grooved raceway formed in the inner lateral surface of the outer bearing ring;
    a bearing cage holding the balls at uniform intervals from one another in a circumferential direction;
    a first circular-ring-shaped seal comprising a first dimensionally stable radial seal leg fastened to the outer bearing ring and a first elastic axial sealing lip that engages under the inner bearing ring; and
    a second circular-ring-shaped seal,
    wherein the first and second circular-ring-shaped seals are situated axially opposite one another, sealing off an interior space of the rolling bearing, which is filled with a rolling bearing lubricant, and
    wherein the first circular-ring-shaped seal is a first angle-profile-shaped lip seal, the first elastic axial sealing lip bears slidingly against the inner lateral surface of the inner bearing ring, the first angle-profile-shaped lip seal forms a first gap seal with a first axial side of the inner bearing ring and the first elastic axial sealing lip of the first angle-profile-shaped lip seal forms a first overpressure valve, such that, when an admissible gas pressure in the interior space is exceeded, the gas pressure is positively ventilated via the first gap seal and via the first elastic axial sealing lip lifting up at least partially from the inner lateral surface of the inner bearing ring.

2. The rolling bearing as claimed in claim 1, wherein the rolling bearing has a primary mass side and a secondary mass side and the outer bearing ring has an encircling receiving groove in the inner lateral surface of the outer bearing ring, and the first circular-ring-shaped seal, which is arranged at the secondary mass side and the second circular-ring-shaped seal is arranged at the primary mass side and forms a lip sealing ring which is held in the encircling receiving groove in the inner lateral surface of the outer bearing ring.

3. The rolling bearing as claimed in claim 2, wherein the outer bearing ring has a further encircling receiving groove in the inner lateral surface of the outer bearing ring, and the first radial seal leg is stiffened by a metal reinforcement and the first angle-profile-shaped lip seal has a free edge section that is snapped into the further encircling receiving groove.

4. The rolling bearing as claimed in claim 2, wherein, in relation to the outer bearing ring, the inner bearing ring has an axial width which is reduced by substantially a thickness of the first radial seal leg, and the inner bearing ring has, on the inner lateral surface, a bearing seat width which is reduced by substantially a length of the first elastic axial sealing lip.

5. The rolling bearing as claimed in claim 4, wherein the inner bearing ring has an encircling groove in the inner lateral surface of the inner bearing ring and a bevel on an axial side of the inner bearing ring, and a part of the inner lateral surface of the inner bearing ring, which is in sliding contact with the first elastic axial sealing lip of the first angle-profile-shaped lip seal, exhibits reduced friction over a width of the part of the inner lateral surface as a result of the encircling groove and the bevel.

6. The rolling bearing as claimed in claim 5, wherein the first angle-profile-shaped lip seal has, on an inner side of the first radial seal leg, an additional pre-sealing lip that prevents liquid lubricant from directly dripping down into the first gap seal between the first radial seal leg and the first axial side of the inner bearing ring.

7. The rolling bearing as claimed in claim 6, wherein the inner bearing ring has an additional circumferential groove in the outer lateral surface of the inner bearing ring, adjacent the additional pre-sealing lip of the first angle-profile-shaped lip seal so as to form a separation edge to prevent lubricant from creeping into the first gap seal under centrifugal force during bearing operation.

8. The rolling bearing as claimed in claim 1, wherein the rolling bearing is a single-row deep groove ball bearing.

9. The rolling bearing as claimed in claim 1, wherein the second circular-ring-shaped seal comprises a second dimensionally stable radial seal leg fastened to the outer bearing ring and a second elastic sealing lip that engages under the inner bearing ring, wherein the second circular-ring-shaped seal is a second angle-profile-shaped lip seal, the second elastic seal bears slidingly against the inner lateral surface of the inner bearing ring, the second angle-profile-shaped lip seal forms a second gap seal with a second axial side of the inner bearing ring and the second elastic sealing lip of the angle-profile-shaped lip forms a second overpressure valve, such that, when an admissible gas pressure in the interior space is exceeded, the gas pressure is positively ventilated via the second gap seal and via the second elastic sealing lip lifting up at least partially from the inner lateral surface of the inner bearing ring.

10. A rolling bearing, for a dual mass flywheel in a motor vehicle, comprising:
    an inner bearing ring having an inner lateral surface and an outer lateral surface with a grooved raceway in the outer lateral surface;
    an outer bearing ring, which is arranged coaxially with respect to the inner bearing ring, having an inner lateral surface and an outer lateral surface with a grooved raceway in the inner lateral surface arranged coaxially with respect to the inner bearing ring; and
    a multiplicity of bearing balls arranged between the inner bearing ring and the outer bearing ring and which roll in the grooved raceway formed in the outer lateral surface of the inner bearing ring and in the grooved raceway formed in the inner lateral surface of the outer bearing ring;
a bearing cage holding the balls at uniform intervals from one another in a circumferential direction; and
two circular-ring-shaped seals situated axially opposite one another, sealing off an interior space of the rolling bearing, which is filled with a rolling bearing lubricant,
wherein at least one of the two seals is an angle-profile-shaped lip seal, which has a dimensionally stable radial seal leg fastened to the outer bearing ring and an elastic sealing lip that engages under the inner bearing ring and bears slidingly against the inner lateral surface of the inner bearing ring, the angle-profile-shaped lip seal forms a gap seal with an axial side of the inner bearing ring and the axial sealing lip of the angle-profile-shaped lip forms an overpressure valve, such that, when an admissible gas pressure in the interior space is exceeded, the gas pressure can be positively ventilated via the gap seal and via the axial sealing lip which lifts up at least partially from the inner lateral surface of the inner bearing ring, and
wherein the lip seal has, on an inner side of the radial seal leg, an additional pre-sealing lip that prevents liquid lubricant from directly dripping down into the gap seal between the seal leg and the axial side of the inner bearing ring.

11. The rolling bearing as claimed in claim 10, wherein the inner bearing ring has a circumferential groove in the outer lateral surface of the inner bearing ring, adjacent the pre-sealing lip of the lip seal so as to form a separation edge to prevent lubricant from creeping into the gap seal under centrifugal force during bearing operation.

* * * * *